(12) United States Patent
Zhou et al.

(10) Patent No.: US 8,930,592 B2
(45) Date of Patent: Jan. 6, 2015

(54) MULTIPATH LOAD BALANCING OPTIMIZATIONS FOR ALUA STORAGE SYSTEMS

(71) Applicant: VMware, Inc., Palo Alto, CA (US)

(72) Inventors: Li Zhou, Campbell, CA (US); Fei Meng, Raleigh, NC (US); Sandeep Uttamchandani, Cupertino, CA (US); Yea-Cheng Wang, Milpitas, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 13/766,605

(22) Filed: Feb. 13, 2013

(65) Prior Publication Data

US 2014/0229638 A1      Aug. 14, 2014

(51) Int. Cl.
  *G06F 3/00*   (2006.01)
  *G06F 3/06*   (2006.01)

(52) U.S. Cl.
  CPC .................................. *G06F 3/0613* (2013.01)
  USPC ........................................................... 710/38

(58) Field of Classification Search
  None
  See application file for complete search history.

(56) References Cited

U.S. PATENT DOCUMENTS

| | | | |
|---|---|---|---|
| 6,600,724 B1 * | 7/2003 | Cheng ............................ | 370/256 |
| 7,730,274 B1 * | 6/2010 | Usgaonkar ..................... | 711/163 |
| 7,760,668 B1 * | 7/2010 | Zinjuvadia ..................... | 370/256 |
| 8,060,775 B1 * | 11/2011 | Sharma et al. ................ | 714/5.11 |
| 2013/0007410 A1 * | 1/2013 | Kopylovitz et al. ........... | 711/209 |
| 2013/0246705 A1 * | 9/2013 | Diare ............................. | 711/114 |

* cited by examiner

*Primary Examiner* — Henry Tsai
*Assistant Examiner* — Aurangzeb Hassan

(57) ABSTRACT

Techniques for performing I/O load balancing are provided. In one embodiment, a computer system can receive an I/O request destined for a storage array, where the computer system is communicatively coupled with the storage array via a plurality of paths, and where the plurality of paths include a set of optimized paths and a set of unoptimized paths. The computer system can further determine whether the I/O request can be transmitted to the storage array via either an optimized path or an unoptimized path, or solely via an optimized path. The computer system can then select a path in the plurality of paths based on the determination and transmit the I/O request to the storage array via the selected path.

20 Claims, 5 Drawing Sheets

MULTIPATH LOAD BALANCING OPTIMIZATIONS FOR ALUA STORAGE SYSTEMS

BACKGROUND

Many enterprise-class storage arrays available today incorporate two disk array controllers (referred to as "controllers"). This dual controller configuration enables high availability—if one controller fails, the other controller can take over and thereby ensure that the storage array is able to continue servicing I/O requests.

Storage vendors generally offer three different types of dual controller storage arrays: (1) "Active/Active," (2) "Active/Standby," and (3) Asymmetric Logical Unit Access (ALUA). In an Active/Active storage array, both controllers are active at all times and can service I/O requests directed to any logical disk (e.g., LUN) resident on the storage array, without any difference in performance. In an Active/Standby storage array, only one controller (i.e., the primary controller) is active at any given time; the other controller (i.e., the secondary controller) is in standby mode. Thus, a host system accessing an Active/Standby storage array can only send I/O requests to the primary controller. An ALUA storage array is similar to an Active/Active storage array in that both controllers are active at all times. However, for any given logical disk resident on an ALUA storage array, only one of the two controllers is optimized. As a result, I/O performance via the unoptimized controller is worse than the optimized controller.

A host system that communicates with a dual controller storage array typically has multiple host bus adapters (HBAs) that connect to the storage array's two controllers. This means that the host system has multiple paths to the storage array (one path per HBA-controller connection). Existing server operating systems and virtualization platforms take advantage of these multiple paths (beyond the high availability use case) by load balancing I/O requests across the paths to achieve better I/O performance (referred to as "multipath load balancing"). However, current multipath load balancing implementations have certain limitations when used in conjunction with ALUA storage arrays. For example, in current implementations, a host system will generally load balance I/O requests only across the optimized paths between the host system and an ALUA storage array (i.e., the paths leading to the optimized controller); the host system will not transmit any I/O requests along an unoptimized path, barring a failure of the optimized controller.

The foregoing approach of utilizing only optimized paths for load balancing purposes works relatively well for hard disk-based ALUA storage arrays, since hard disk-based arrays have relatively high I/O latency and can support relatively few I/O Operations Per Second (IOPS) (e.g., 100K or less), and therefore I/O contention in this scenario generally occurs on the array, rather than the host side (in other words, the optimized paths between the host system and the storage array are rarely saturated). However, this approach is less suitable for "all-flash" ALUA storage arrays (i.e., ALUA storage arrays based entirely on flash storage) that are becoming increasingly popular. An all-flash ALUA storage array can easily serve millions of IOPS and thus can saturate the optimized paths leading from a host system. This shifts the point of I/O contention from the array side to the host side and significantly increases the amount of host-to-array I/O bandwidth needed to keep the storage array fully utilized, typically beyond what the optimized paths alone can deliver.

SUMMARY

Techniques for performing I/O load balancing are provided. In one embodiment, a computer system can receive an I/O request destined for a storage array, where the computer system is communicatively coupled with the storage array via a plurality of paths, and where the plurality of paths include a set of optimized paths and a set of unoptimized paths. The computer system can further determine whether the I/O request can be transmitted to the storage array via either an optimized path or an unoptimized path, or solely via an optimized path. The computer system can then select a path in the plurality of paths based on the determination and transmit the I/O request to the storage array via the selected path.

The following detailed description and accompanying drawings provide a better understanding of the nature and advantages of particular embodiments.

DETAILED DESCRIPTION

Figure 1:
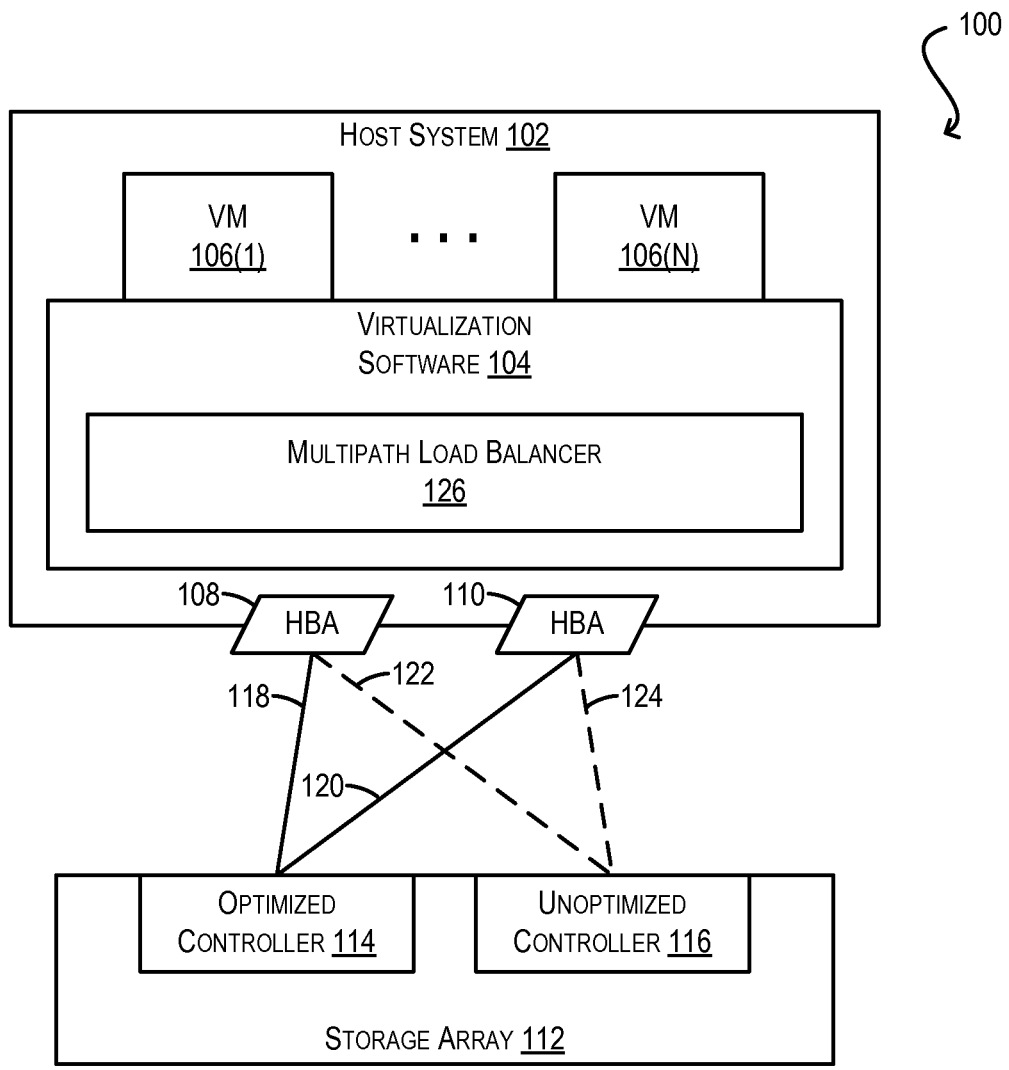
FIG. 1 depicts a block diagram of a system environment that supports optimized multipath load balancing according to one embodiment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

Particular embodiments enable a host system to perform optimized I/O load balancing with respect to an ALUA storage array, where the host system is connected to the ALUA storage array via multiple paths, and where the multiple paths include optimized paths (i.e., paths leading to an optimized controller of the ALUA storage array) and unoptimized paths (i.e., paths leading to an unoptimized controller of the ALUA storage array). In one embodiment, the host system can receive (from, e.g., a virtual machine (VM) running on the host system) an I/O request destined for the ALUA storage array. The host system can further determine whether the I/O request can be transmitted to the ALUA storage array via one of the unoptimized paths (i.e., can be "spread" to the unoptimized paths), or whether the I/O request must transmitted via one of the optimized paths. This determination can be based on, e.g., an "I/O spread" parameter that the host system dynamically enables and disables in response to various conditions. The host system can then select a path in view of the determination and transmit the I/O request along the selected path.

With the approach above, the host system can effectively load balance I/O requests across all of the paths, both optimized and unoptimized, between the host system and the ALUA storage array. This increases the aggregate I/O bandwidth between the two devices, and thus can improve IOPS and I/O throughput in situations where I/O contention occurs on the host side. This approach is particularly effective when used in conjunction with all-flash ALUA storage arrays, since such arrays are typically able to saturate the bandwidth of the optimized paths. By using the unoptimized paths as an additional load balanced resource, the host system can transmit more I/O requests per second to an all-flash ALUA storage array than otherwise possible via the optimized paths alone, and therefore can take full advantage of the high bandwidth/low latency characteristics of the all-flash storage array.

In one set of embodiments, the host system can limit the load balancing of I/O requests across optimized and unoptimized paths to write requests only. In these embodiments, the host system always transmits read requests via an optimized path to the ALUA storage array, barring a failure of the optimized controller. This optimization can be beneficial for at least two reasons. First, each controller of a dual controller storage array typically maintains a controller-specific cache memory to cache data blocks for read and write requests. The controller can instantly service read requests from the cache (assuming the requested data block is available in the controller's cache memory). One the other hand, each controller needs to synchronize with the other controller upon caching a write request in order to guarantee cache coherency. This means that read requests have an affinity for a particular controller (i.e., the controller at which the data block was previously requested), whereas write requests do not. Accordingly, it may be preferable in particular embodiments to always send read requests to the optimized controller of an ALUA storage array (thereby increasing the cache hit rate at the optimized controller).

Second, it is becoming increasingly common for host systems in a virtualized environment to include a solid state disk (SSD) for host-side SSD caching. Host-side SSD caching can dramatically reduce the percentage of read requests that hit a backend storage array, since many read requests are serviced via the SSD cache. However, host-side SSD caching does not have any effect on the percentage of write requests that hit the backend storage array. This skews the ratio of read/write I/Os serviced by the backend storage array towards write I/Os, and thus increases the need for improved write performance.

In another set of embodiments, the host system can implement certain policies for enabling/disabling the I/O spread parameter, and thereby control the initiation/termination of I/O request spreading to the unoptimized paths. For example, in one embodiment, the host system can enable the I/O spread parameter if the host system detects I/O contention on the host side (in other words, if the optimized paths become saturated), and can disable the I/O spread parameter if the host system no longer detects I/O contention on the host side. This policy ensures that the unoptimized paths are only used when the optimized paths do not have sufficient bandwidth to handle the current load of I/O requests.

In a further embodiment, the host system can additionally disable the I/O spread parameter if the host system determines that the maximum I/O latency on the unoptimized paths exceeds a predefined threshold, or if there is no increase in aggregate IOPs or I/O throughput to the ALUA storage array with the I/O spread parameter enabled. These policies ensure that the host system does not use the unoptimized paths in scenarios where the unoptimized controller of the ALUA storage array performs particularly poorly—this can occur since different storage vendors implement the ALUA standard differently, and thus certain vendors' storage arrays can have very poor performance for the unoptimized paths. These policies also ensure that the I/O spread parameter is disabled when I/O request spreading to the unoptimized paths does not result in a noticeable performance improvement.

FIG. 1 depicts a system environment 100 that supports optimized multipath load balancing according to one embodiment. System environment 100 includes a host system 102 that executes virtualization software 104. Virtualization software 104 (also known as a "hypervisor") is a software layer that provides an environment in which one or more VMs 106(1)-106(N) can run. In one embodiment, virtualization software 104 can interact directly with the hardware platform of host system 102 without an intervening host operating system. In this embodiment, virtualization software 104 can include a kernel (not shown) that manages VM use of the various hardware devices of host system 102. In an alternative embodiment, virtualization software 104 can be part of a "hosted" configuration in which virtualization software 104 runs on top of a host operating system (not shown). In this embodiment, virtualization software 104 can rely on the host operating system for physical resource management of hardware devices. One of ordinary skill in the art will recognize various modifications and alternatives for the design and configuration of virtualization software 104.

As shown, host system 102 is communicatively coupled (via HBAs 108 and 110) with a storage array 112 that includes an optimized controller 114 and an unoptimized controller 116. In one embodiment, storage array 112 can be an ALUA storage array (i.e., a storage array that supports the ALUA standard). In a further embodiment, storage array 112 can be an all-flash storage array.

Like the controllers of Active/Active storage arrays, controllers 114 and 116 of storage array 112 can be active at the same time, and thus can simultaneously service I/O requests from host system 102. However unlike the controllers of Active/Active storage arrays, controllers 114 and 116 can provide unequal levels of I/O performance. For instance, optimized controller 114 can provide relatively faster I/O access to the logical disks (e.g., LUNs) resident on storage array 112, whereas unoptimized controller 116 can provide relatively slower I/O access to the same logical disks. In the embodiment of FIG. 1, host system 102 is connected to optimized controller 114 via two paths—path 118 (from HBA 108) and path 120 (from HBA 110)—which are referred to as optimized paths. Additionally, host system 102 is connected to unoptimized controller 116 via two paths—path 122 (from HBA 108) and path 124 (from HBA 110)—which are referred to as unoptimized paths.

To enable load balancing of VM I/O requests across the various paths to storage array 112, virtualization software 104 includes a multipath load balancer 126. In one embodiment, multipath load balancer 126 can be implemented as a pluggable software component within a storage I/O layer of virtualization software 104, such as a Path Selection Plugin (PSP) within the Pluggable Storage Architecture (PSA) of the ESXi Hypervisor developed by VMware, Inc. Generally speaking, multipath load balancer 126 can receive I/O requests from VMs 106(1)-106(N), select, for each I/O request, a path for transmitting the I/O request to storage array 112, and then forward the I/O request along the selected path.

As noted the Background section, existing multipath load balancing implementations have certain limitations when used in conjunction with ALUA storage arrays such as storage array 112. In particular, existing multipath load balancing implementations load balance I/O requests solely across the optimized paths to an ALUA storage array; they never spread I/O requests to the unoptimized paths. This is a waste of resources in scenarios where the aggregate I/O bandwidth between host system 102 and storage array 112 is the limiting factor for overall I/O performance. To address this, multipath load balancer 126 can include functionality for load balancing I/O requests across unoptimized paths 122 and 124 (in addition to optimized paths 118 and 120). As described in further detail below, this functionality allows multipath load balancer 126 to intelligently make use of unoptimized paths 122 and 124 when such use would result in improved I/O performance between host system 102 and storage array 112.

Figure 2:
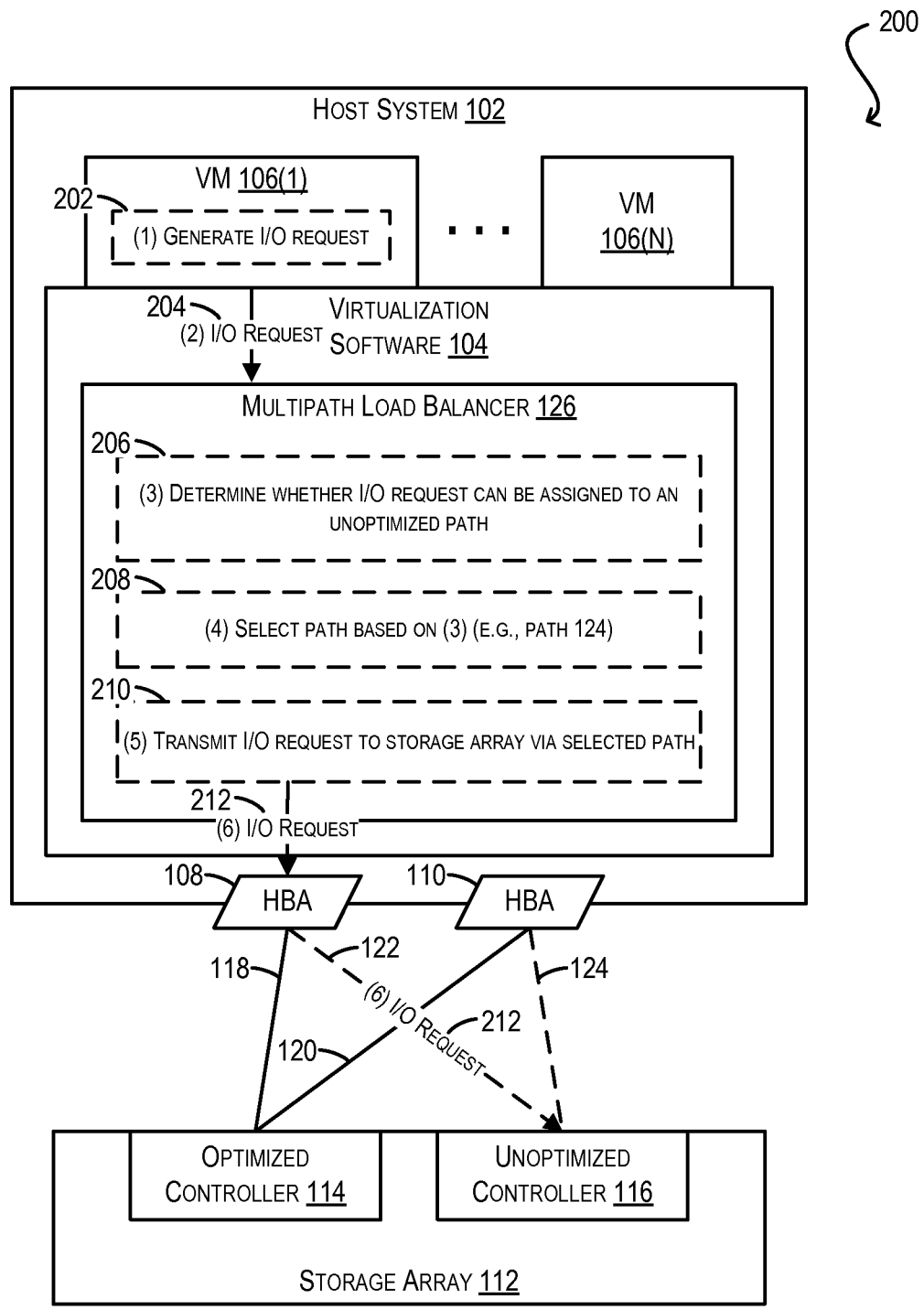
FIG. 2 depicts a flow within the block diagram of FIG. 1 for performing optimized multipath load balancing according to one embodiment.

FIG. 2 depicts a flow 200 within system environment 100 for performing optimized multipath load balancing according to an embodiment. At step (1) (reference numeral 202), VM 106(1) running on host system 102 can generate an I/O request destined for storage array 112. The I/O request can be, e.g., a read or write request. At step (2) (reference numeral 204), virtualization software 104 can receive the I/O request and pass the request to multipath load balancer 126.

At step (3) (reference numeral 206), multipath load balancer 126 can determine whether the I/O request may be assigned to one of the unoptimized paths (i.e., 122, 124) leading to storage array 112, or whether the I/O request must be assigned to one of the optimized paths (i.e., 118, 120). This determination can be based on an I/O spread parameter that, when enabled, allows I/O request spreading to the unoptimized paths, and when disabled, disallows I/O request spreading to the unoptimized paths. In certain embodiments, multipath load balancer 126 can dynamically enable and disable the I/O spread parameter to ensure that I/O request spreading to the unoptimized paths is only active when it would result in an increase in I/O performance between host system 102 and storage array 112 (described with respect to FIGS. 4 and 5 below).

In a particular embodiment, multipath load balancer 126 can limit the spread of I/O requests across unoptimized paths 122 and 124 to write requests only. In other words, as part of step (3), multipath load balancer 126 can determine whether the I/O request is a write request or a read request and, if the I/O request is a read request, multipath load balancer 126 can determine that the read request must be assigned to an optimized path 118 or 120 (regardless of the I/O spread parameter). As noted previously, read requests typically have an affinity for a particular controller (whereas write requests do not), and so it makes sense to always send read requests to the same controller (e.g., the optimized controller). In addition, if host system 102 implements host-side SSD caching, a large percentage of the I/O requests hitting storage array 112 will likely be write requests, which means that the spreading of write requests to unoptimized paths 122 and 124 will have a greater effect on lowering the I/O load of optimized paths 118 and 120 than the spreading of read requests.

At step (4) (reference numeral 208), multipath load balancer 126 can select a path for transmitting the I/O request to storage array 112 based on the determination made at step (3). For example, if multipath load balancer 126 determined that the I/O request may be assigned to an unoptimized (or optimized) path, multipath load balancer 126 can select path 118, 120, 122 or 124. On the other hand, if multipath load balancer 126 determined that the I/O request must be assigned to an optimized path, multipath load balancer 126 is limited to selecting path 118 or 120. In one embodiment, multipath load balancer 126 can use a round robin algorithm at step (4), such that multipath load balancer 126 selects a path according to a predefined path order. In alternative embodiments, multipath load balancer 126 can use any other selection algorithm.

Finally, at step (5) (reference numeral 210), multipath load balancer 126 can transmit the I/O request to storage array 112 via the selected path. In the example of FIG. 2, the I/O request is shown as being transmitted over unoptimized path 122 (step (6), reference numeral 212).

Figure 3:
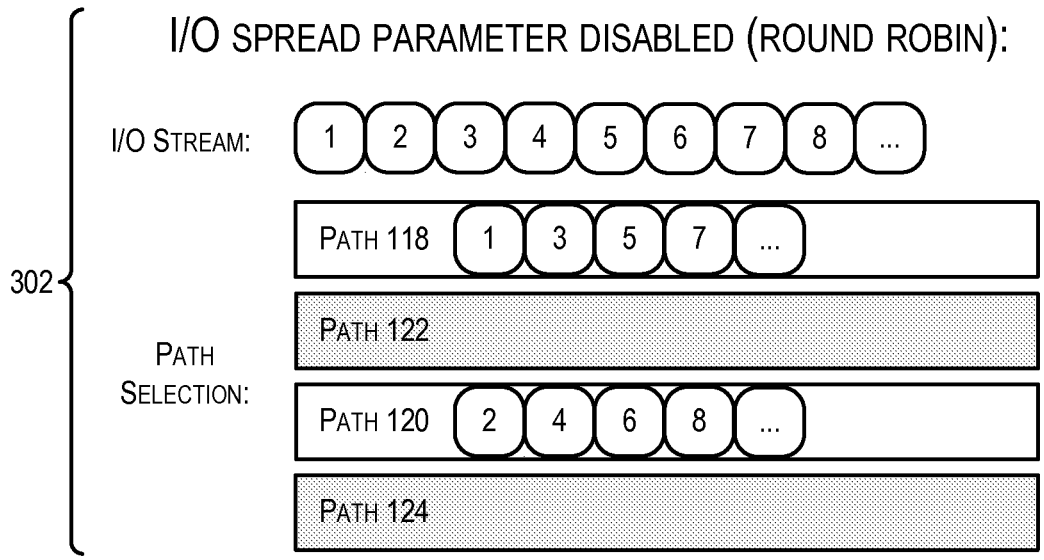
FIG. 3 depicts examples of how a sample I/O stream can be load balanced according to one embodiment.
Figure 3:
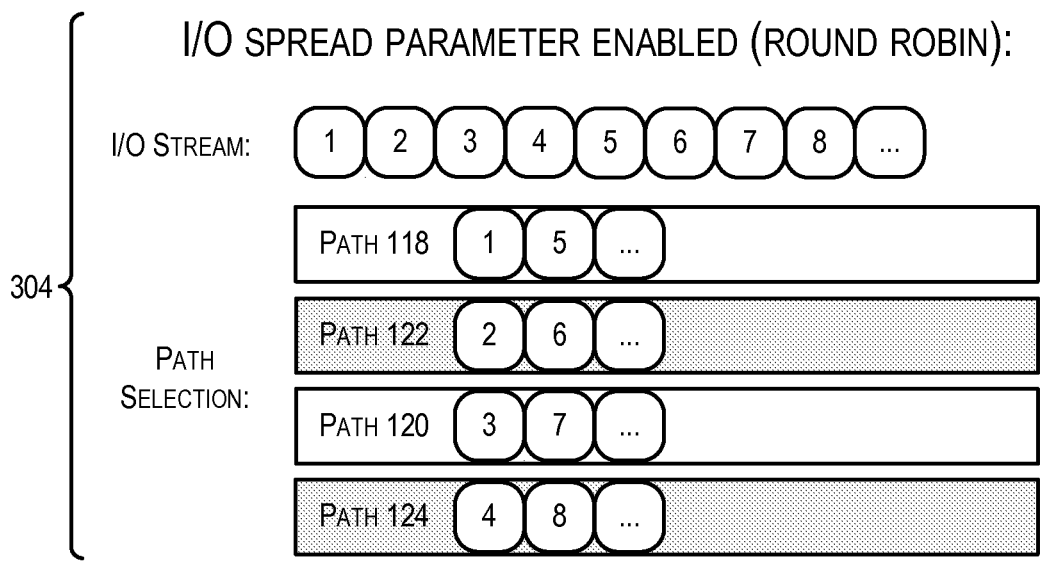

To further clarify the operation of multipath load balancer 126, FIG. 3 depicts examples 302 and 304 of how a sample I/O stream can be load balanced according to an embodiment. In particular, example 302 illustrates how multipath load balancer 126 can load balance the sample I/O stream when the I/O spread parameter is disabled, and example 304 illustrates how multipath load balancer 126 can load balance the sample I/O stream when the I/O spread parameter is enabled. Note that these examples assume that multipath load balancer 126 uses a round robin algorithm for selecting paths.

In example 302 (i.e., I/O spread parameter disabled), multipath load balancer 126 does not perform any I/O request spreading to unoptimized paths 122 and 124. Thus, multipath load balancer 126 distributes I/O requests 1-8 in the I/O stream evenly between optimized paths 118 and 120.

In example 304 (i.e., I/O spread parameter enabled), multipath load balancer 126 performs I/O request spreading to unoptimized paths 122 and 124. Accordingly, multipath load balancer 126 distributes I/O requests 1-8 in the I/O stream evenly between all paths 118-124 (both optimized and unoptimized).

As described above, in certain embodiments multipath load balancer 126 can implement policies for enabling/disabling the I/O spread parameter, and thereby control the initiation/termination of I/O request spreading to unoptimized paths 122 and 124. Since unoptimized paths 122 and 124 generally provide worse performance than optimized paths 118 and 120, these policies can ensure that unoptimized paths 122 and 124 are only used for load balancing purposes when their use will result in an improvement in the aggregate I/O performance between host system 102 and storage array 112.

Figure 4:
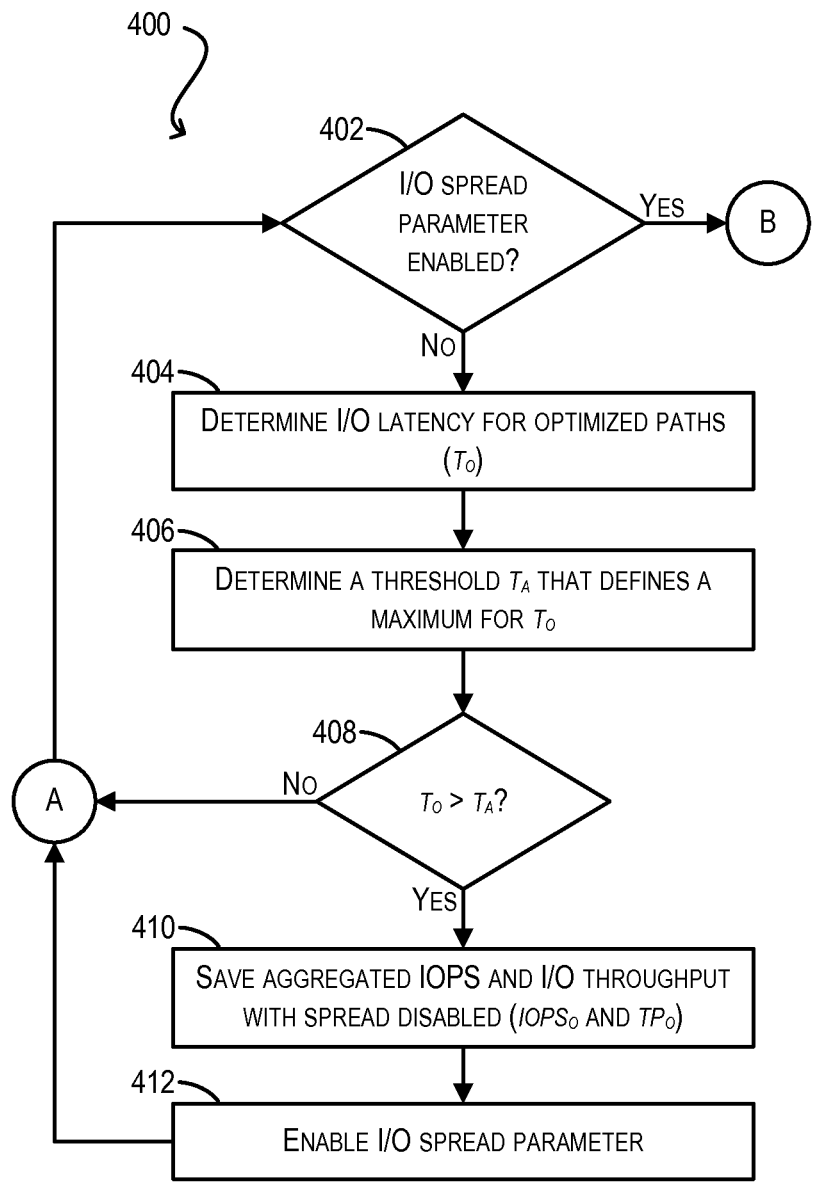
FIG. 4 depicts a flowchart for enabling an I/O spread parameter according to one embodiment.
Figure 5:
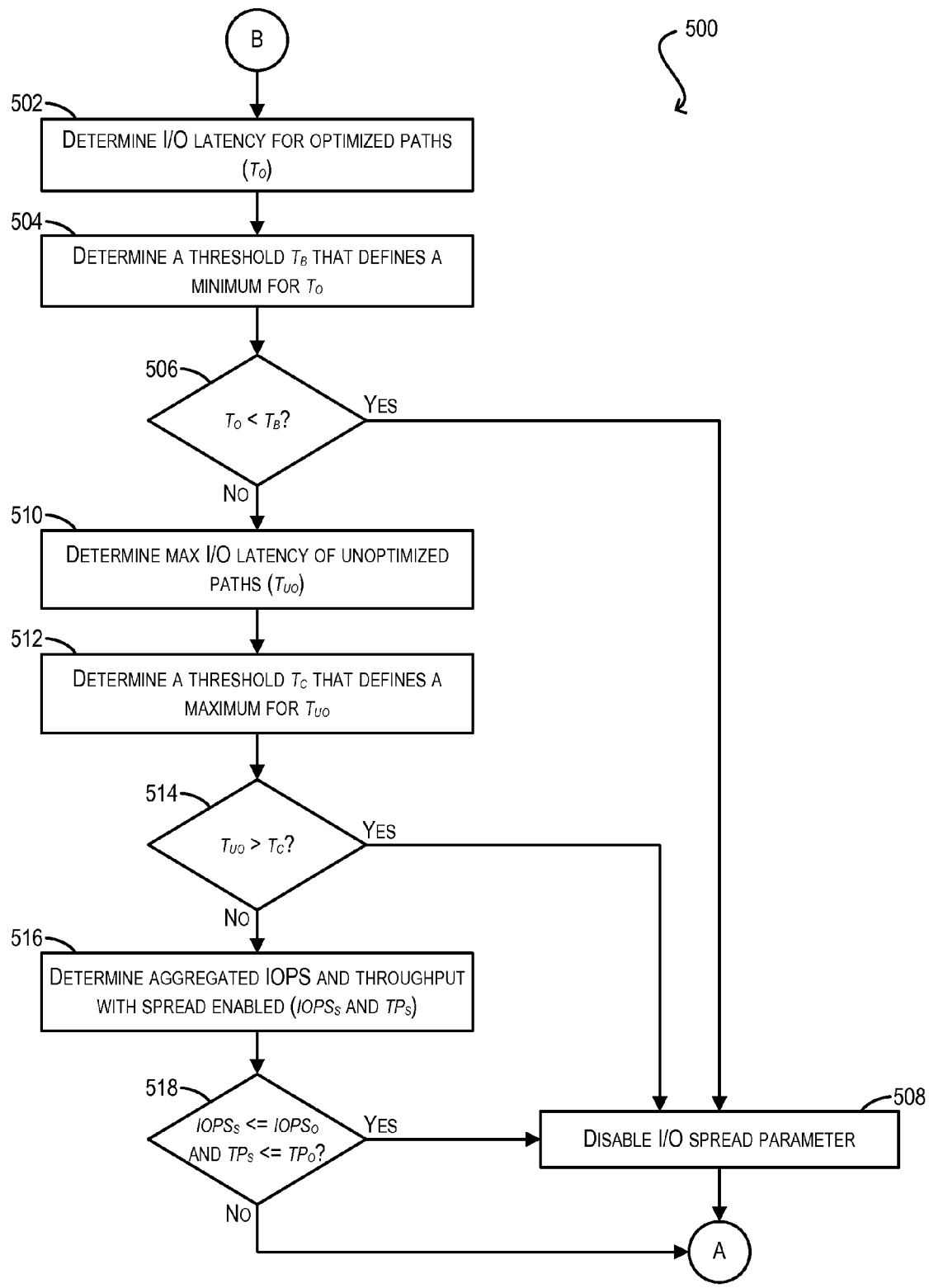
FIG. 5 depicts a flowchart for disabling an I/O spread parameter according to one embodiment.

FIGS. 4 and 5 depict processes 400 and 500 that can be performed by multipath load balancer 126 for enabling and disabling the I/O spread parameter respectively according to an embodiment. In particular, in process 400, multipath load balancer 126 checks whether there is I/O contention on the host side (indicating that optimized paths 118 and 120 are saturated), and if so, enables the I/O spread parameter. In process 500, multipath load balancer 126 checks if (1) I/O contention on the host side has subsided, (2) the maximum I/O latency on unoptimized paths 122 and 124 has exceeded a predefined threshold, or (3) there is no increase in aggregate IOPs or I/O throughput to storage array 112 with the I/O spread parameter enabled. If any of these conditions are true, multipath load balancer 126 disables the I/O spread parameter. In one embodiment, multipath load balancer 126 can perform processes 400 and 500 asynchronously in relation to flow 200 of FIG. 2. In other embodiments, multipath load balancer 126 can perform processes 400 and 500 as part of step (3) of flow 200.

At block 402 of FIG. 4, multipath load balancer 126 can check whether the I/O spread parameter is currently enabled. If the I/O spread parameter is not enabled, multipath load balancer 126 can carry out a series of steps (blocks 404-412) to determine whether the I/O spread parameter should be enabled. For example, at block 404, multipath load balancer 126 can monitor for and determine an average I/O latency for optimized paths 118 and 120 ($T_O$). Multipath load balancer 126 can also determine a predefined threshold $T_A$ that defines a maximum value for $T_O$ (block 406).

At block 408, multipath load balancer 126 can compare $T_O$ to $T_A$. If $T_O$ is less than or equal to $T_A$, multipath load balancer 126 can conclude that there is not enough host side I/O contention to turn on I/O request spreading to unoptimized paths 122 and 124, and thus the I/O spread parameter can remain disabled. The flow of process 400 can then return to block 402, such that multipath load balancer 126 can reevaluate the I/O spread parameter at a later point in time.

On the other hand, if $T_O$ is greater than $T_A$, multipath load balancer 126 can conclude that optimized paths 118 and 120 are saturated. In response, multipath load balancer 126 can save the current aggregated IOPS and I/O throughout on optimized paths 118 and 120 ($IOPS_O$ and $TP_O$ respectively) and enable the I/O spread parameter (blocks 410 and 412). As above, the flow of process 400 can then return to block 402.

If, at block 402, multipath load balancer 126 determines that the I/O spread parameter is currently enabled, multipath load balancer 126 can carry out the steps shown in FIG. 5 to determine whether the I/O spread parameter should be disabled. For example, at block 502, multipath load balancer 126 can monitor for and determine an average I/O latency for optimized paths 118 and 120 ($T_O$). At block 504, multipath load balancer 126 can determine a predefined threshold $T_B$ indicating a minimum value for $T_O$.

At block 506, multipath load balancer 126 can compare $T_O$ to $T_B$. If $T_O$ is less than $T_B$, multipath load balancer 126 can conclude that I/O contention on the host side has subsided, and thus multipath load balancer 126 can disable the I/O spread parameter (block 508). Multipath load balancer 126 can then return to block 402 of FIG. 4 to reevaluate the I/O spread parameter at a later time.

If $T_O$ greater than $T_B$, multipath load balancer 126 can conclude that there is still sufficient host side I/O contention to necessitate the spreading of I/O requests to unoptimized paths 122 and 124. Multipath load balancer 126 can subsequently move on to checking the performance of unoptimized paths 122 and 124. In particular, at block 510, multipath load balancer 126 can monitor for and determine a maximum I/O latency for unoptimized paths 122 and 124 ($T_{UO}$). Multipath load balancer 126 can also determine a predefined threshold $T_C$ that defines a maximum value for $T_{UO}$ (block 512).

At block 514, multipath load balancer 126 can compare $T_{UO}$ to $T_C$. If $T_{UO}$ is greater than $T_C$, multipath load balancer 126 can conclude that the performance of unoptimized paths 122 and 124 is unacceptably poor, and thus multipath load balancer 126 can disable the I/O spread parameter (block 508). As above, multipath load balancer 126 can then return to block 402 of FIG. 4.

If $T_{UO}$ is less than or equal to $T_C$, multipath load balancer 126 can conclude that the performance of unoptimized paths 122 and 124 is acceptable. Multipath load balancer 126 can subsequently move on to checking whether there has been an overall improvement in I/O performance between host system 102 and storage array 112 with the I/O spread parameter enabled. For example, at block 516, multipath load balancer 126 can determine the current aggregated IOPS and I/O throughput across paths 118-124 with the I/O spread parameter enabled ($IOPS_S$ and $TP_S$ respectively). Multipath load balancer 126 can then compare $IOPS_S$ and $TP_S$ to the IOPS and throughput values ($IOPS_O$ and $TP_O$ respectively) collected at block 410 of FIG. 4 (i.e., when the I/O spread parameter was disabled) (block 518).

If $IOPS_S$ is less than or equal to $IOPS_O$ and $TP_S$ is less than or equal to $TP_O$, multipath load balancer 126 can conclude that there has been no performance increase (with respect to IOPS or I/O throughput) with the I/O spread parameter enabled. As a result, multipath load balancer can disable the I/O spread parameter (block 508). On the other hand, if either $IOPS_S$ or $TP_S$ is greater than $IOPS_O$ or $TP_O$ respectively, multipath load balancer 124 can determine that the I/O spread parameter should remain enabled. In either case, the flow of process 500 can thereafter return to block 402 of FIG. 4, such that multipath load balancer 126 can reevaluate the I/O spread parameter on an as-needed basis.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The non-transitory computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for performing I/O load balancing, the method comprising:
    receiving, by a computer system, I/O requests destined for a storage array, the computer system being communicatively coupled with the storage array via a plurality of paths, the plurality of paths including a set of optimized paths and a set of unoptimized paths;
    determining, by the computer system, whether the I/O requests can be load balanced across both the set of optimized paths and the set of unoptimized paths, or can solely be load balanced across the set of optimized paths; and
    for each I/O request:
        if the I/O requests can be load balanced across both the set of optimized paths and the set of unoptimized paths, selecting either an optimized path or an unoptimized path using a selection algorithm that takes into account all paths in the plurality of paths;
        if the I/O requests can solely be load balanced across the set of optimized paths, selecting an optimized path using a selection algorithm that takes into account only the set of optimized paths; and
        transmitting, by the computer system, the I/O request to the storage array via the selected path.

2. The method of claim 1 wherein the determining comprises checking whether an I/O spread parameter associated with the storage array is enabled or disabled.

3. The method of claim 2 wherein enablement of the I/O spread parameter indicates that the I/O requests can be load balanced across both the set of optimized paths and the set of unoptimized paths, and wherein disablement of the I/O spread parameter indicates that the I/O requests can be solely load balanced across the set of optimized paths.

4. The method of claim 2 wherein the I/O spread parameter applies solely to write requests, such that read requests are always transmitted to the storage array via an optimized path regardless of whether the I/O spread parameter is enabled or disabled.

5. The method of claim 2 further comprising updating the I/O spread parameter on a periodic basis.

6. The method of claim 5 wherein the I/O spread parameter is enabled when there is I/O contention on the set of optimized paths.

7. The method of claim 6 wherein enabling the I/O spread parameter comprises:
    determining an I/O latency for the set of optimized paths; and
    enabling the I/O spread parameter if the I/O latency for the set of optimized paths exceeds a threshold.

8. The method of claim 6 wherein the I/O spread parameter is disabled when there is no longer I/O contention on the set of optimized paths.

9. The method of claim 8 wherein disabling the I/O spread parameter comprises:
    determining an I/O latency for the set of optimized paths; and
    disabling the I/O spread parameter if the I/O latency for the set of optimized paths falls below a threshold.

10. The method of claim 8 wherein the I/O spread parameter is further disabled when assignment of I/O requests to the set of unoptimized paths does not improve I/O performance of the set of optimized paths.

11. The method of claim 10 wherein disabling the I/O spread parameter comprises:
    determining a first aggregated I/O Operations Per Second (IOPS) value and a first aggregated I/O throughput value for the set of optimized paths before the I/O spread parameter was enabled;
    determining a second aggregated IOPS value and a second aggregated I/O throughput value for the set of optimized paths and the set of unoptimized paths after the I/O spread parameter was enabled; and
    disabling the I/O spread parameter if the second aggregated IOPS value does not exceed the first aggregated IOPS value or if the second aggregated I/O throughput value does not exceed the first aggregated I/O throughput value.

12. The method of claim 10 wherein the I/O spread parameter is further disabled when a maximum I/O latency of the set of unoptimized paths exceeds a threshold.

13. The method of claim 1 wherein the storage array is an Asymmetric Logical Unit Access (ALUA) storage array.

14. The method of claim 13 where the storage array is an all-flash storage array.

15. A non-transitory computer readable storage medium having stored thereon computer software executable by a processor of a computer system, the computer software embodying a method for performing I/O load balancing, the method comprising:
    receiving, by a computer system, I/O requests destined for a storage array, the computer system being communicatively coupled with the storage array via a plurality of paths, the plurality of paths including a set of optimized paths and a set of unoptimized paths;
    determining, by the computer system, whether the I/O requests can be load balanced across both the set of optimized paths and the set of unoptimized paths, or can solely be load balanced across the set of optimized paths; and
    for each I/O request:
        if the I/O requests can be load balanced across both the set of optimized paths and the set of unoptimized paths, selecting either an optimized path or an unoptimized path using a selection algorithm that takes into account all paths in the plurality of paths;
        if the I/O requests can solely be load balanced across the set of optimized paths, selecting an optimized path using a selection algorithm that takes into account only the set of optimized paths; and transmitting, by the computer system, the I/O request to the storage array via the selected path.

16. The non-transitory computer readable storage medium of claim 15 wherein the determining comprises checking whether an I/O spread parameter associated with the storage array is enabled or disabled, wherein the I/O spread parameter is enabled when there is I/O contention on the set of optimized paths, and wherein the I/O spread parameter is disabled when there is no longer I/O contention on the set of optimized paths, when assignment of I/O requests to the set of unoptimized paths does not improve I/O performance of the set of optimized paths, or when a maximum I/O latency of the set of unoptimized paths exceeds a threshold.

17. The non-transitory computer readable storage medium of claim 16 wherein the I/O spread parameter applies solely to write requests, such that read requests are always transmitted to the storage array via an optimized path regardless of whether the I/O spread parameter is enabled or disabled.

18. A system for performing I/O load balancing, the system comprising:

a processor;

a plurality of host bus adapters (HBAs) that communicatively couple the system with a storage array via a plurality of paths, the plurality of paths including a set of optimized paths and a set of unoptimized paths; and a data store having stored thereon executable program code which, when executed by the processor, causes the processor to:

receive I/O requests destined for the storage array;

determine whether the I/O requests can be load balanced across both the set of optimized paths and the set of unoptimized paths, or can solely be load balanced across the set of optimized paths; and for each I/O request:

if the I/O requests can be load balanced across both the set of optimized paths and the set of unoptimized paths, select either an optimized path or an unoptimized path using a selection algorithm that takes into account all paths in the plurality of paths;

if the I/O requests can solely be load balanced across the set of optimized paths, select an optimized path using a selection algorithm that takes into account only the set of optimized paths; and transmit the I/O request to the storage array via the selected path.

19. The system of claim 18 wherein the determining comprises checking whether an I/O spread parameter associated with the storage array is enabled or disabled, wherein the I/O spread parameter is enabled when there is I/O contention on the set of optimized paths, and wherein the I/O spread parameter is disabled when there is no longer I/O contention on the set of optimized paths, when assignment of I/O requests to the set of unoptimized paths does not improve I/O performance of the set of optimized paths, or when a maximum I/O latency of the set of unoptimized paths exceeds a threshold.

20. The system of claim 19 wherein the I/O spread parameter applies solely to write requests, such that read requests are always transmitted to the storage array via an optimized path regardless of whether the I/O spread parameter is enabled or disabled.

* * * * *